US 6,683,871 B1

(12) United States Patent
Lee et al.

(10) Patent No.: US 6,683,871 B1
(45) Date of Patent: Jan. 27, 2004

(54) INTERNET PROTOCOL TELEPHONY

(75) Inventors: Chinmei Chen Lee, Woodridge, IL (US); Milo Orsic, Lincolnwood, IL (US); Werner Ulrich, Glen Ellyn, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/335,279

(22) Filed: Jun. 17, 1999

(51) Int. Cl.⁷ .............................................. H04L 12/66
(52) U.S. Cl. .................... 370/356; 370/352; 370/395.52
(58) Field of Search ................................. 370/354, 352, 370/356, 389, 328, 331, 338, 395.52, 446; 379/88.17, 88.19, 88.15; 455/426, 422, 433, 432, 435, 439, 466

(56) References Cited

U.S. PATENT DOCUMENTS

| | | | | |
|---|---|---|---|---|
| 6,137,791 A | * | 10/2000 | Frid et al. ..................... | 370/352 |
| 6,161,008 A | * | 12/2000 | Lee et al. ..................... | 455/414 |
| 6,222,829 B1 | * | 4/2001 | Karlsson et al. .............. | 370/329 |
| 6,327,267 B1 | * | 12/2001 | Valentine et al. .............. | 370/466 |
| 6,373,836 B1 | * | 4/2002 | Deryugin et al. ........... | 370/352 |
| 6,393,018 B2 | * | 5/2002 | Miloslavsky ................ | 370/270 |
| 6,434,134 B1 | * | 8/2002 | La Porta et al. ............. | 370/338 |
| 6,512,754 B2 | * | 1/2003 | Feder et al. ................. | 370/338 |

FOREIGN PATENT DOCUMENTS

| | | | | |
|---|---|---|---|---|
| EP | 781015 | 6/1997 | ........... | H04L/29/06 |
| EP | 794643 | 9/1997 | ........... | H04L/29/06 |
| EP | 818908 | 1/1998 | ........... | H04L/29/06 |

OTHER PUBLICATIONS

Handley RFC 2543; Session Initiation Protocol, Mar. 1999.*

* cited by examiner

Primary Examiner—Phirin Sam

(57) ABSTRACT

A method and apparatus for establishing a connection to a customer telecommunications station, having Internet service, but not currently connected to the Internet. In response to receipt by the Internet of a call to that station, the station is located for the purpose of notifying the station of the call. If the called station is a wireless station, the paging message includes an indication that the page is for an Internet Protocol, (IP) telephone call. For wireline stations, other alerting techniques are used to indicate that a station is being called on an Internet call. In response to receiving the notification, the called station automatically logs on to the Internet, and is assigned a temporary Internet Protocol address, (IPA). A connection is then established between the access point of the caller on the Internet, and the access point of the called customer. Advantageously, an Internet subscriber need not be presently connected to the Internet to receive IP telephone calls.

28 Claims, 9 Drawing Sheets

INTERNET PROTOCOL TELEPHONY

TECHNICAL FIELD

This invention relates to establishment of a telephone connection using Internet protocol (IP) to a station that is not currently connected to the Internet.

Problem

Data Network Protocol Telephony, such as Internet Telephony, (otherwise known as IP (Internet Protocol) Telephony) i.e., the routing of telephone calls through the Internet is now possible between two stations, both of which are connected on an active connection to the Internet. However, in the prior art, it is not possible to complete a call to a wireless powered-up station or a land-line station that at the time a call is originated, has no active connection to the Internet. With the increasing prevalence of both Internet service and cellular service, this is a serious limitation.

Solution

The above problems are solved, and an advance is made over the teachings of the prior art in accordance with the principles of this invention, wherein in response to a request to establish a data network protocol, such as an Internet Protocol (IP) telephone call to a wireless or wireline station that is not currently connected to the Internet, the station is notified and requested to initiate registration and connection to the Internet; after the station is so connected and registered, the IP telephone call can be completed.

In one specific implementation, if the called station is a wireless station, the wireless station is paged, and the paging message includes an indication that the page request is for an IP telephone call; in response to the paging request, the wireless station initiates a connection to a point of presence, hereinafter called a home agent, for terminating the incoming call within the Internet; the Internet then establishes a connection between the appearance of the incoming call at the input of the Internet, and this home agent. Advantageously, such an arrangement allows a suitably equipped cellular station to receive IP calls, even when the station, though powered-up, is not on an active connection to the Internet.

In accordance with one preferred embodiment of the invention, if the terminating cellular station moves, and attaches itself to a foreign agent, a connection is established within the Internet between the home agent and the foreign agent for communicating with the cellular station. Advantageously, the cellular station may move during the course of the conversation without losing the IP call.

If the called station is a wireline station not currently connected to a point of presence or home agent, the called station is alerted, without establishing a connection to a serving switch, with an indication that the called station should register on the Internet at a home agent for serving the called station. After the called station has registered and is connected to the home agent, the call is completed as in the prior art IP telephony procedures.

If the terminating wireline station has a Personal Computer (PC), there are a number of ways of alerting the PC without establishing a connection. A pre-programmed caller identification can be sent as a caller ID signal, and intercepted in the caller ID unit to generate an appropriate signal to the PC. Called number identification can be used to send either a special called number which can be interpreted by the called number identifier unit of the terminating subscriber as an indication to request a registration on the Internet, or an added number dedicated to this purpose can be used; in the latter case, this added number is stored in either the DDS or the ITHS, and is passed through the PSTN to the called number. A suppressed ringing connection can be used to access a telemetering interface unit, and this telemetering interface unit upon receipt of an appropriate data message can trigger the PC to request registration. If the terminating station is an ISDN, (Integrated Services Digital Network) station, the data message for causing the PC to request an Internet registration action can be passed as a control message over the D-channel. In all of these cases, no connection need actually be set-up in the PSTN; it is adequate if the Common Channel Signaling (CCS7) network of the PSTN, transmits a message that the terminating switch understands and can act upon.

If the called station is a wireline station not currently connected to a point of presence or home agent, the called station is alerted, without establishing a connection to a serving switch, with an indication that the called station should register on the Internet at a home agent for serving the called station. After the called station has registered and is connected to the home agent, the call is completed as in the prior art IP telephony procedures.

In accordance with one preferred embodiment of the invention, the caller need not be a "dial-up" Internet station, but can be a wireless, or wireline connected to the Internet via the Public Switched Telephone Network, (wireless or wireline). Such a caller is connected in accordance with the principles of the prior art via an Internet Telephony Gateway, for performing the function of converting between circuit voice signals and IP packets. Other caller terminals may be directly connected via a data access network to a point of presence on the Internet.

BRIEF DESCRIPTION OF THE DRAWING(S)

DETAILED DESCRIPTION

Figure 1:
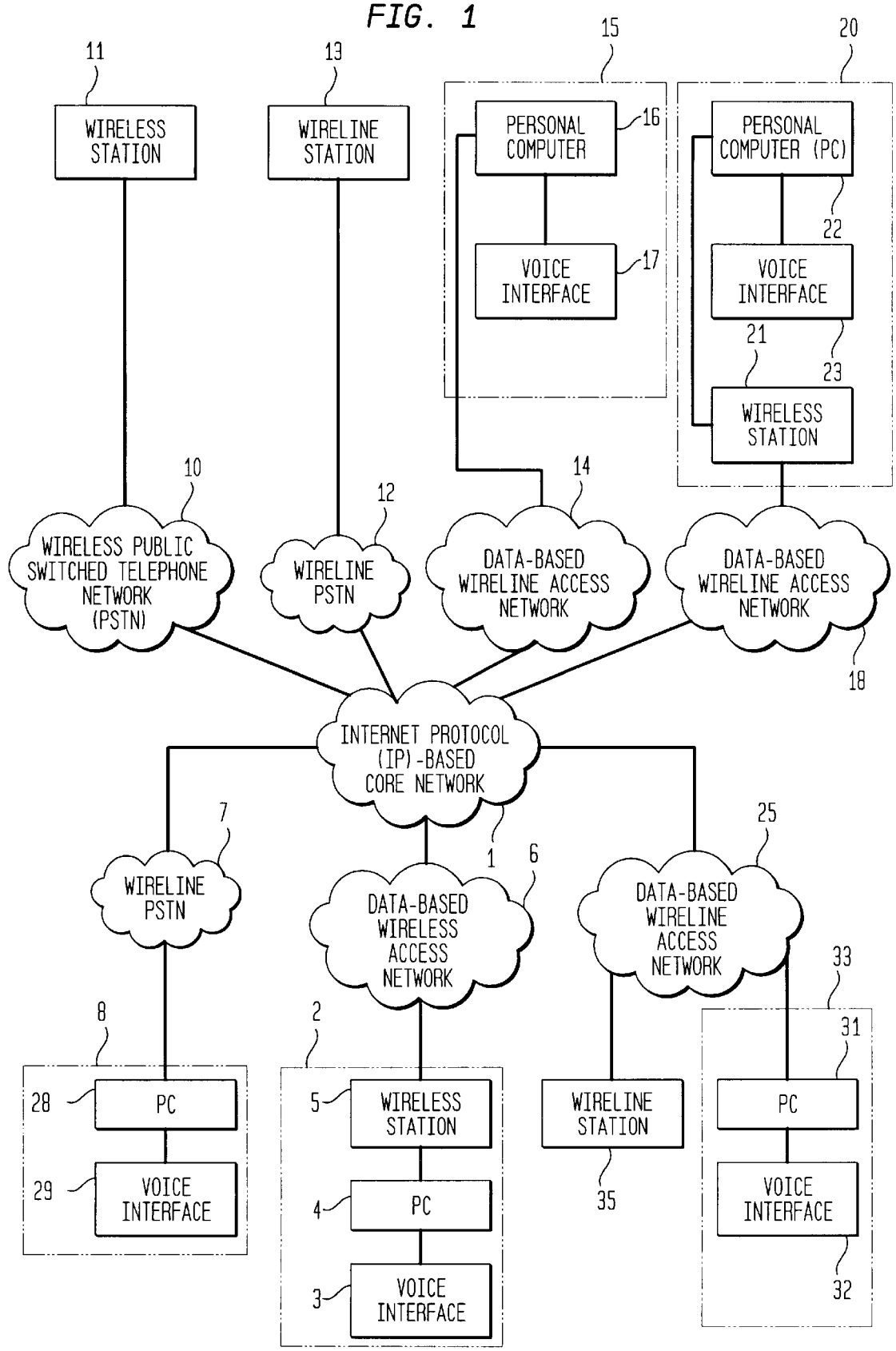
FIG. 1 illustrates the configurations that can be served using Applicants' invention.

FIG. 1 illustrates the types of calls that can be served using the principles of Applicants' invention. The callers may be a wireless station 11, connected to the Internet core network 1 through the wireless Public Switch Telephone Network (PSTN) 10; a wireline telephone station 13, connected to the Internet via the wireline PSTN 12; a station 15, comprising a PC (Personal Computer) 16 and an audio interface 17, connected via a data-based wireline access network 14; and a wireless station 20, comprising a wireless station 21, a PC 22, and an audio interface 23, and connected via a data-based wireless access network to the Internet 1. The Internet 1 is an Internet Protocol, (IP) based core network.

A receiving cellular wireless station 2 is connected to the Internet 1, via a data-based wireless access network 6. The receiving station 2 comprises a wireless station 5, a PC 4 connected to the wireless station, and an audio interface 3. In addition, another called customer station, wireline station 8, comprising PC 28 connected to an audio interface 29, is connected to the Internet through wireline PSTN 7. Also, in addition, data-based wireline access network 25 can be used to access terminals, such as telephone station 35 or station 33 comprising PC 31 connected to an audio interface 32. As is well known in the prior art, the data-based wireline access network 25, and the wireline PSTN 7, can be connected to terminals through cable systems which can deliver circuit signals, such as pulse code modulation (PCM), or data signals such as IP signals.

Figure 2:
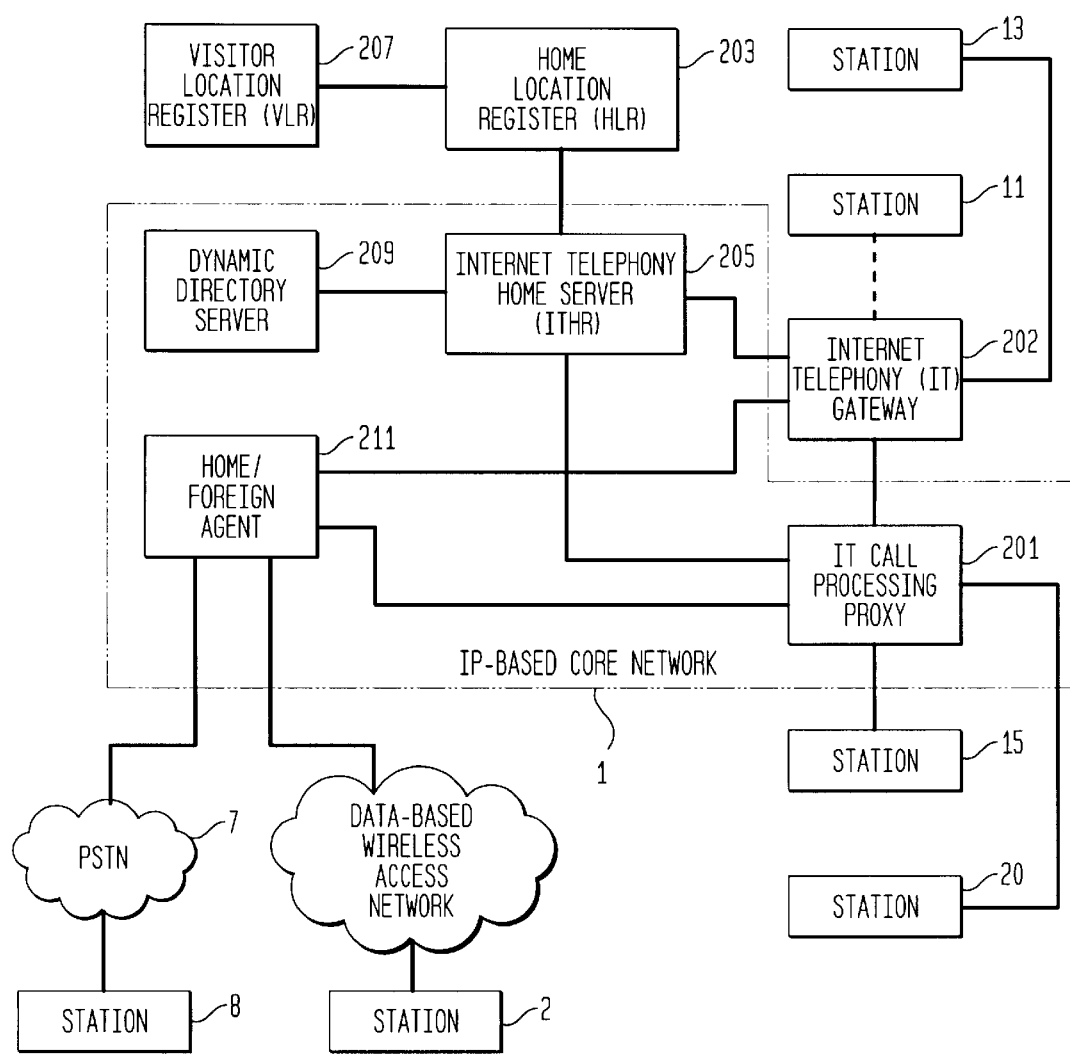
FIG. 2 illustrates the basic architecture of Applicants' invention.

FIG. 2 is a diagram, illustrating the pertinent aspects of the architecture of Applicants' invention for a call to a cellular wireless station 2, or to a wireline station 8. Stations 11 and 13 are connected via a PSTN, (not shown), and an Internet Telephony Gateway 202, and station 20 is directly connected to the Internet 1, through software in or PC 22 of station 20, for communicating with Internet Telephony Call Processing Proxy 201 in the Internet. Block 201 receives an identification of the called party. Consider first, the case of a wireless cellular station 2. The identification is a telephone number, (an E.164 number as specified by the Standards). This number is received by an Internet Telephony Home Server (ITHS) 205, which serves the same basic function as a Home Location Register (HLR) 203 in a wireless PSTN. The ITHS determines whether the called number is that of an IP telephony user, or a wireless or wireline PSTN user. If the received number is a wireless PSTN E.164 number, and not the number of an Internet telephony user, the ITHS 205 sends a query to HLR 203, and the call is completed as in the prior art.

If the called number is that of an IP telephony user, the ITHS 205 translates the called number to a Network Access Identifier (NAI), and queries a Dynamic Directory Server (DDS) 209, (using the NAI), to obtain the IP address of the called party. If the called party is already registered on the Internet, and the call is to a wireless station, the call is completed as in the prior art. If the DDS indicates that the called party is not already registered on the Internet, the ITHS communicates its information to Home Location Register (HLR) 203, which responds with the identity of the Visitor Location Register 207. If necessary, the HLR then queries VLR 207 in order to find the information necessary for paging the called party. A paging request is sent to the Mobile Switching Center, (not shown), which causes one or more base stations to page the called party in accordance with the principles of the prior art. The paging message contains an indication that the called party is being called on an IP telephone call. The message accompanying the paging is sent by receiving wireless station 5, to PC 4. In response to receiving this message, PC 4 activates software for processing this message. The receiving station 2 then transmits a request to register and establish a connect-ion to the Internet. A home agent 211 is assigned for the called party. (The home agent unit also serves 7 as a foreign agent if a hand-off requires the use of a new foreign agent for connection to the wireless station). The called party is then connected to a Home Agent 211, which communicates through the Internet with the calling party via IT Call Processing Proxy 201, or Internet Telephony Gateway 202.

Now, consider the case in which the called party is a wireline terminal such as terminal 8. When the call arrives at the Internet Telephony Gateway 202 or the Internet Telephony Call Processing Proxy 201, the ITHS is queried with E.164 telephone number. The ITHS translates this number to a network access identifier (NAI) and queries DDS 209 with that NAI. DDS 209 determines whether the specified NAI is already connected to the Internet, in which case the call proceeds as in the prior art, or whether the NAI is not at present connected to the Internet. In the latter case, the DDS reports the fact of non-connection to ITHS 205. ITHS 205 then causes a signaling message to be sent from the switch serving the Internet Telephony Gateway 202 or the Internet Telephony Call Processing Proxy 201 via the channel signaling network of wireline PSTN 7 to the switch, (not shown), serving the called party 8. The object of this message is not to establish a telephone communication, but to cause the serving switch to alert PC 28 of the called terminal 8 that the PC should initiate an Internet registration process in order to receive the call as an Internet Telephony call.

If the called station is a wireline station not currently connected to a point of presence or home agent, the called station is alerted, without establishing a connection to a serving switch, with an indication that the called station should register on the Internet at a home agent for serving the called station. After the called station has registered and is connected to the home agent, the call is completed as in the prior art IP telephony procedures.

In response to receipt of an indication that the terminating station should register on the Internet in order to receive an Internet Telephony call, the PC 28 initiates such a registration. Once the registration is completed, the DDS is informed of the registration of that NAI and the address in the Internet where that NAI can be found. The call is then completed from the Internet Telephony Gateway 202, or the Internet Telephony Call Processing Proxy 201 through the Internet Network 1 to the PC of the called station.

Figure 3A:
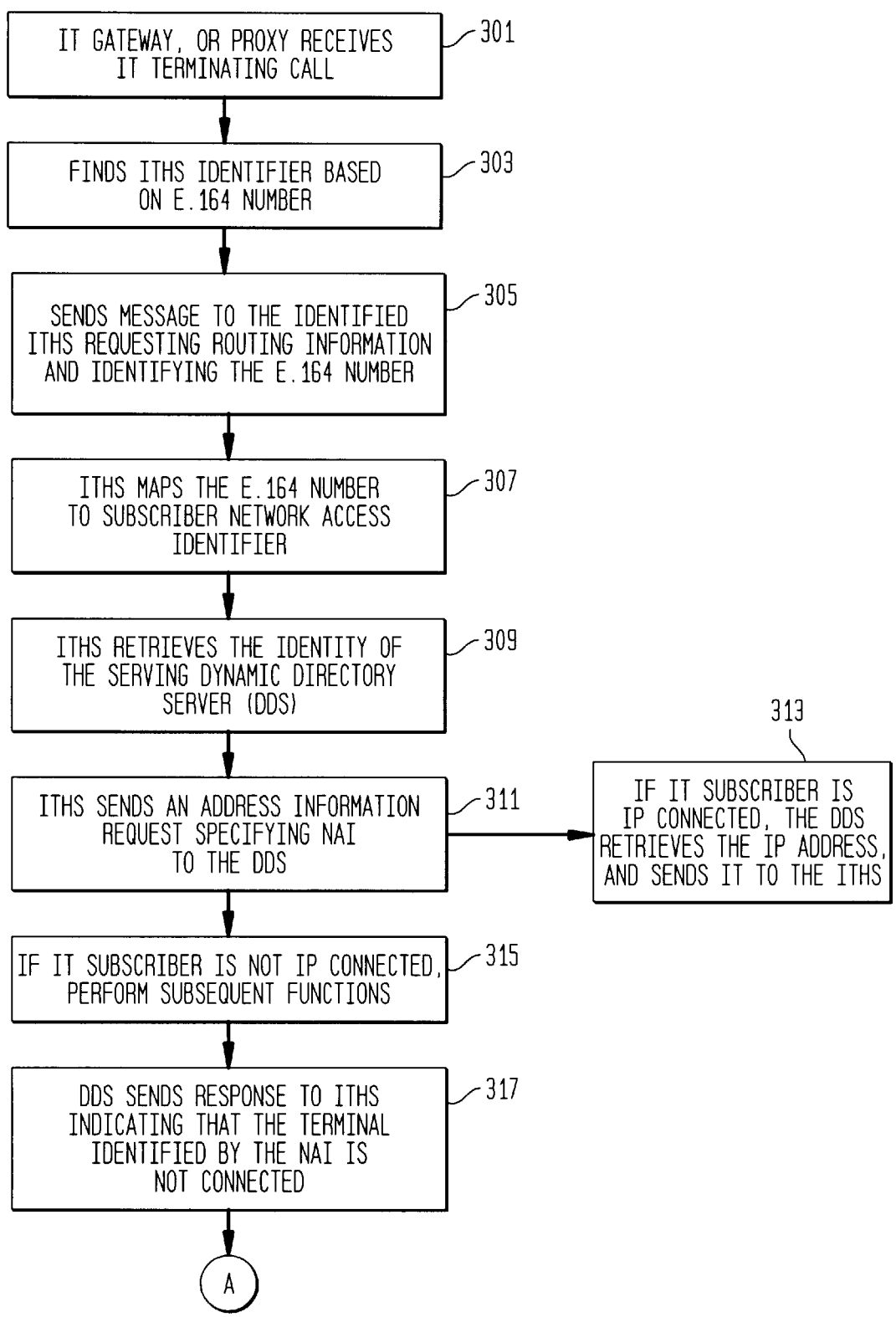
FIGS. 3–6 are flow diagrams, illustrating the process of Applicants' invention.
Figure 3B:
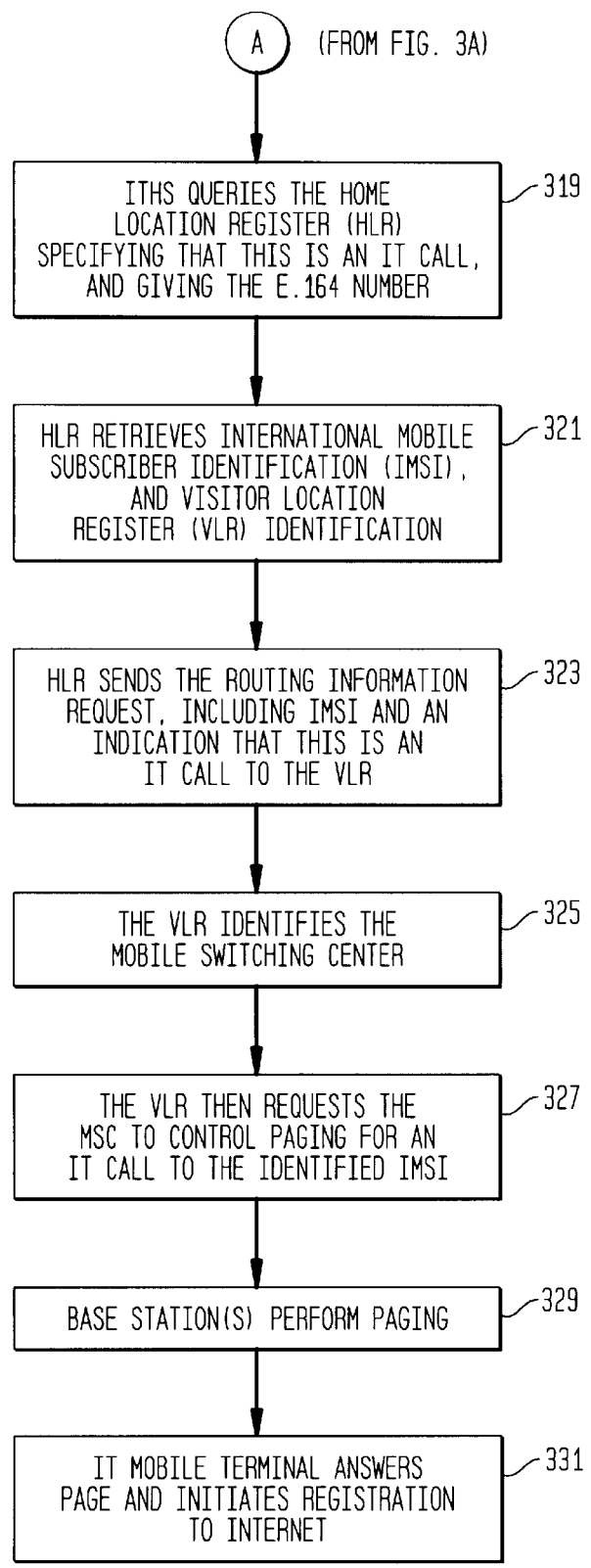
Figure 4:
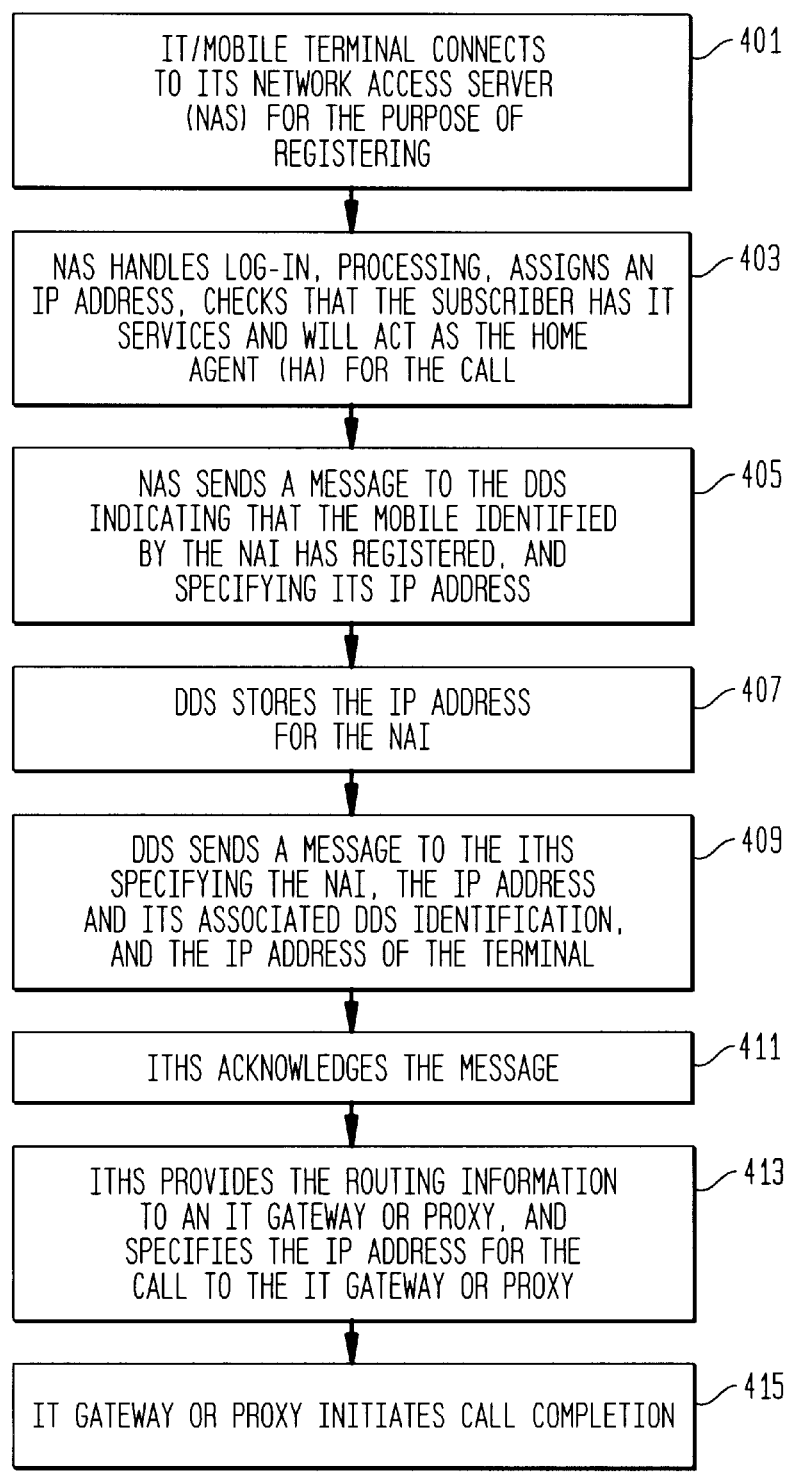

FIGS. 3 and 4 are flow charts, illustrating the process of delivering an Internet Telephony call to a wireless cellular station, having Internet capabilities, but not registered on the Internet at this time. Calls to a station that is currently registered on the Internet are handled as in the prior art. One specific system for using Home Location Registers (HLRs) and Visitor Location Registers (VLRs) is illustrated; other systems can be readily adapted to the application of this invention.

A call is received at the Internet Telephony Gateway (FIG. 2, 202), from a non-IP station, such as station 11 or 13, or is received at the IT Call Processing Proxy (FIG. 2, 201), from an IP station, such as station 15 or 20 of FIG. 2, (Action Block 301). The receiving entity finds the identity of the ITHS, (Block 205, FIG. 2), that can serve this call based on the E.164 number of the called party, (Action Block 303). The receiving block then sends a request for routing information, including the E.164 number to the identified ITHS, (Action Block 305). The ITHS then obtains the Network Access Identifier, (NAI) of the called party and the identity of the serving Dynamic Directory Server, (Action Block 309), and sends a request to the identified DDS, including the NAI, (Action Block 311). If the identified subscriber is registered and connected to the Internet, then the IP address for that subscriber is obtained, returned to the ITHS, and the call is completed as in the prior art, (Action Block 313). If the IT subscriber is not connected, then a not-connected indication is sent back from the DDS to the ITHS, (Action Block 317). The ITHS has an indicator that the called party is wireless. The rest of FIG. 3, relates to completing calls to a wireless cellular station. The ITHS then sends a request to the HLR, (identified by the E.164 number of the called customer), requesting routing information, and specifying the E.164 number of the called customer, and an indication that this is for an Internet Telephony Call, (Action Block 319). The HLR retrieves the International Mobile Subscriber Identifier (IMSI), and the Visitor Location Register (VLR), of the called customer, (Action Block 321). The HLR then sends a message to the VLR to request a paging action, specifying the IMSI for the called party, and the fact that this is for an Internet Telephony Call, (Action Block 323). The VLR in response to this request, which includes an indication of an Internet Telephony call, identifies the mobile switching center (MSC), that is currently serving the called station, and requests that the identified MSC through the appropriate base station(s), page the mobile, including in the paging message an indication that this is an Internet Telephony Call, (Action Block 327). The base station(s) performed the page, (Action Block 329), and the called station in response to receiving the page, initiates a registration on the Internet, (Action Block 331).

FIG. 4 illustrates the process of registration of the terminating station, and address delivery to that station. The called terminal initiates a registration, specifying its network access identifier, (Action Block 401). The receiving network access server processes the log-in, assigns an IP address, checks to make sure that the subscriber has Internet Telephony services, and will act as the initial home agent for the call, (Action Block 403). The network access server then notifies the Dynamic Directory Server of the registration, identifying it by the called customer's NAI, and provides the IP address that has been assigned to the called customer station, (Action Block 405). The DDS stores the IP address for this NAI, and sends its identity to the Internet Telephone Home Server, (Block 203, FIG. 2, Action Block 407). The DDS sends a message to the ITHS indicating the NAI, the IP address of the DDS, and the IP address of the called customer station, (Action Block 409). The ITHS responds with an acknowledgment, (Action Block 411), and transmits to the IT Gateway, or the IT Call Processing Proxy, whichever had initiated the request, the IP address of the called customer station, (Action Block 413). Now, the call can be completed as in the prior art, (Action Block 415).

Figure 5A:
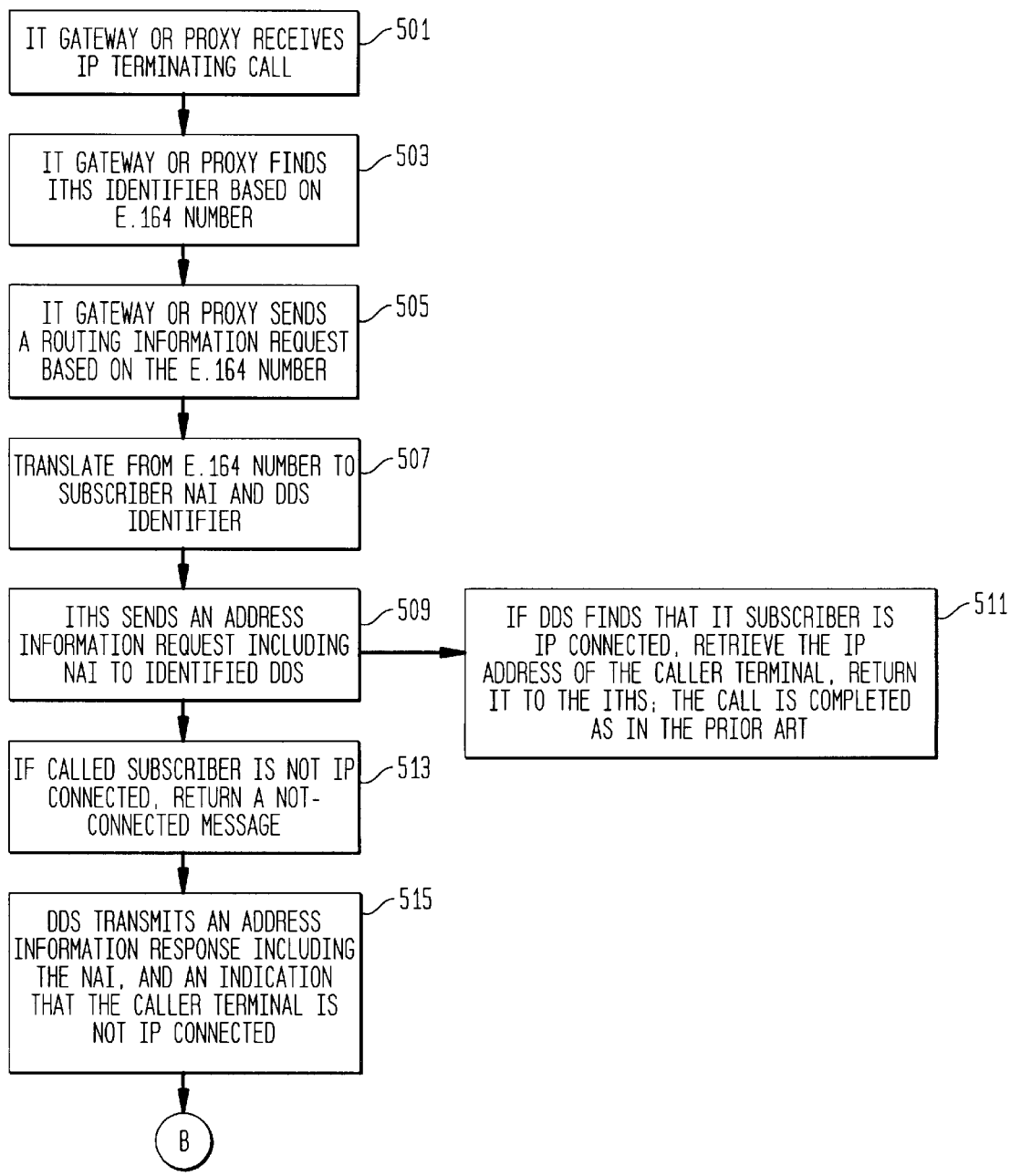
Figure 5B:
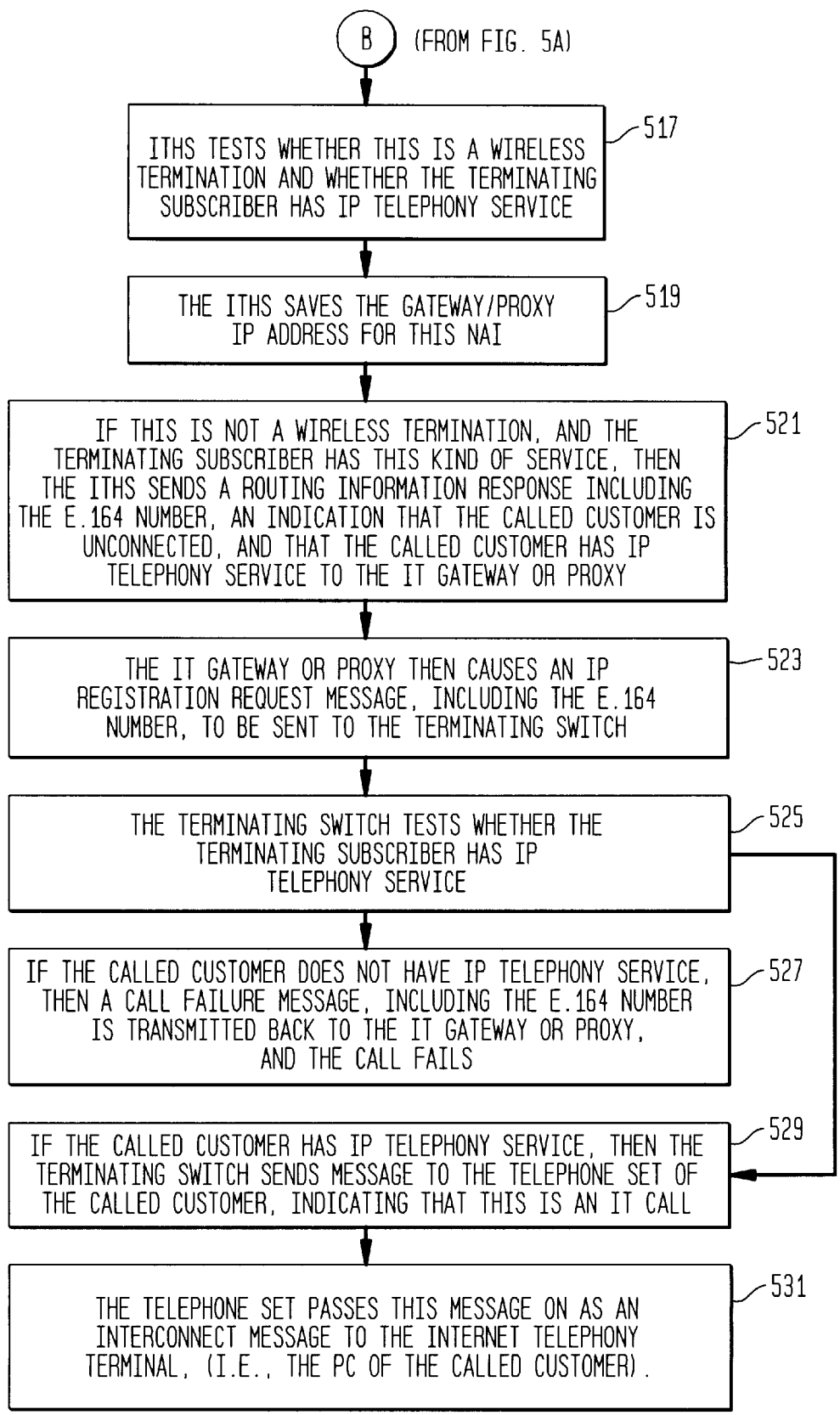
Figure 6A:
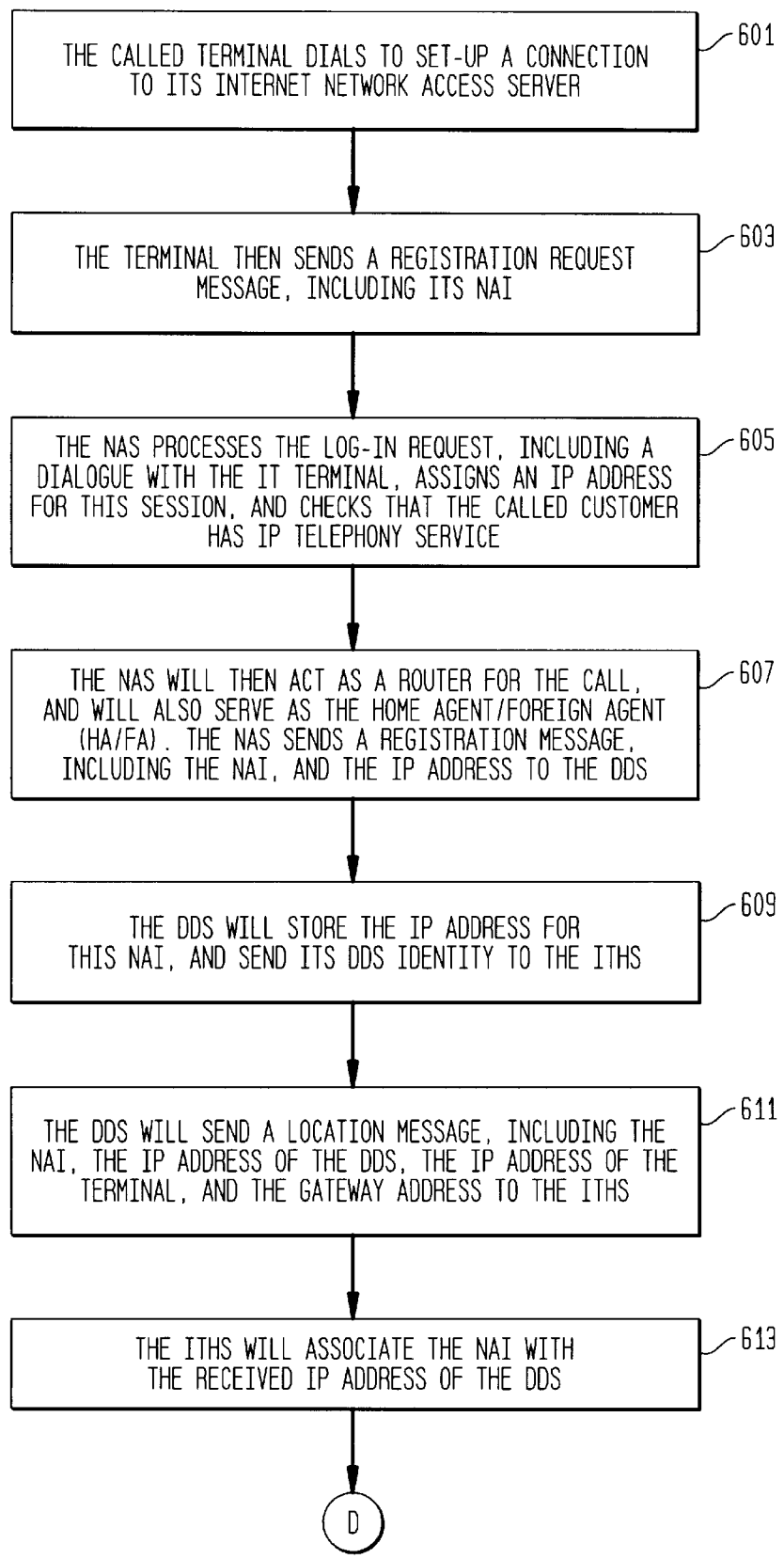
Figure 6B:
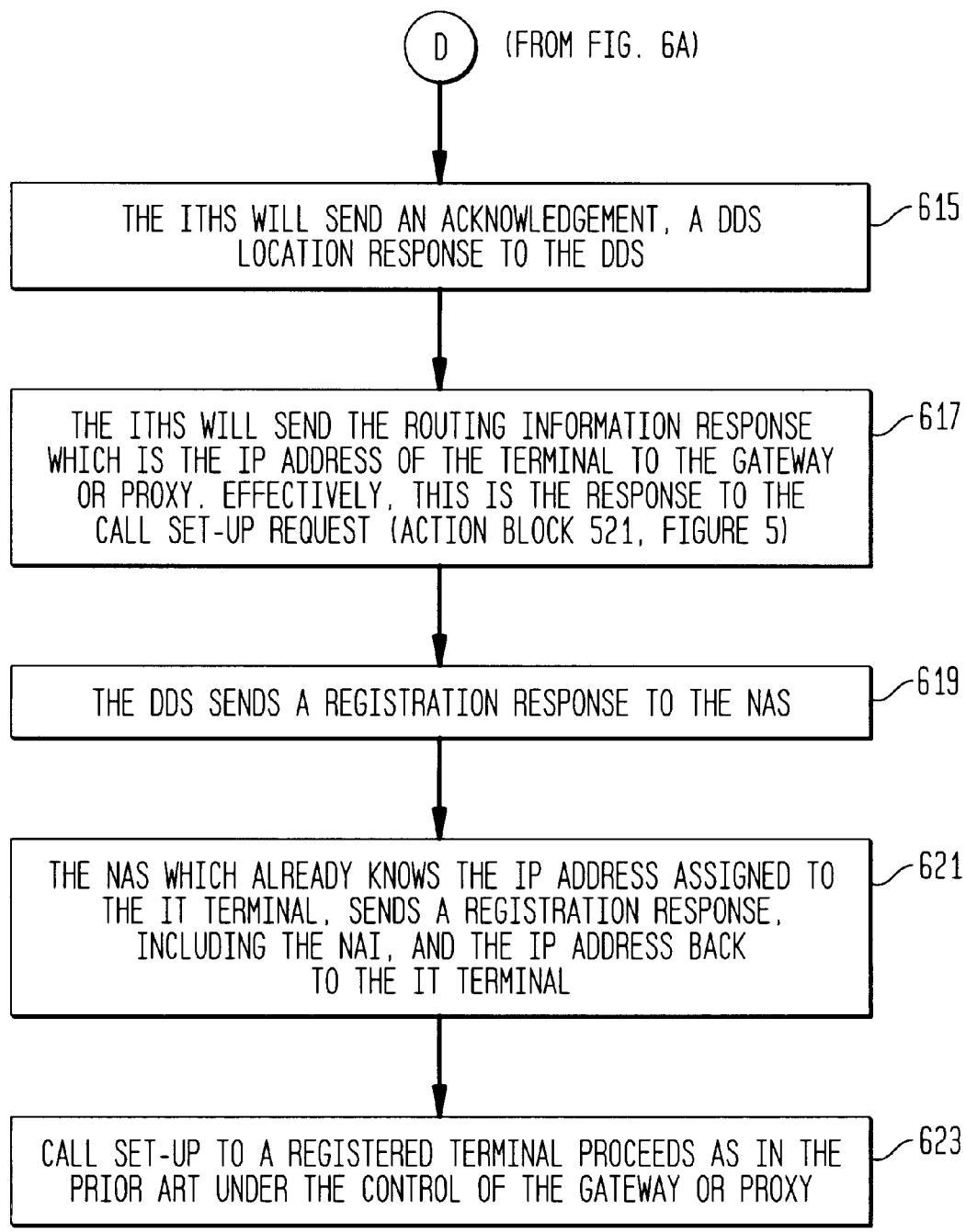

FIGS. 5 and 6 illustrate the process of delivering calls to unconnected wireline subscribers who subscribe to Internet. An Internet Gateway or a Proxy for representing the originating terminal in the Internet, receives an IP telephony terminating call, (Action Block 501). The Gateway or Proxy finds the identifier of the ITHS associated with the called number based on the received E.164 number, (Action Block 503). The Gateway or Proxy sends a routing information request, including the E.164 number, to the identified ITHS, (Action Block 505). The ITHS translates between the E.164 number and the terminating subscriber network access identifier (NAI), and retrieves the identity of the Dynamic Directory Server for that subscriber, (Action Block 507). The ITHS sends a request for an IP address to the identified Dynamic Directory Server (DDS), using the identified NAI as the parameter for making the request, (Action Block 509). If the IT subscriber is already IP connected to the network, then the IP address is retrieved, and the call proceeds to completion as in the prior art. If the terminating DDS finds that the terminating number is that of a terminating IT subscriber who is not at this time IP connected, the DDS must respond back to the ITHS, (Action Block 513). In this case, the DDS responds with a message indicating that the identified NAI is not IP connected, (Action Block 515). The ITHS checks for the characteristics of this call, (Action Block 517). If this is not a wireless termination, then the ITHS saves the identity of the IT Gateway/Proxy IP address for this NAI, (Action Block 519). The ITHS sends a message back to the IT Gateway or Proxy, including the E.164 number, and an indication that the called customer is at present unconnected to the Internet, but has IP telephony service, (Action Block 521). The IT Gateway, or Proxy causes its serving switch to send a common channel signaling message to the terminating switch identified by the E.164 number, indicating that this is an IP call, (Action Block 523). In conformance with normal call processing, the terminating switch checks whether the terminating subscriber has this kind of service, (Test 525). If not, the terminating switch causes a call failure message to be sent to the IT Gateway or Proxy and the call fails, (Action Block 527). If so, then the terminating switch sends an IP call indication message to the terminating subscriber's telephone set, (Action Block 529). The terminating subscriber's telephone set forwards an Internet connection request to the terminal, (PC), of the called customer to initiate registration to the Internet, (Action Block 531).

FIG. 6 illustrates the process of registering the wireline station, (the called terminal), on the Internet, and completing the call once the called terminal has registered. The IT terminal dials to access its network access server, (NAS), (Action Block 601). The IT terminal then initiates registration providing its NAI to the NAS, (Action Block 603). The NAS processes the log-in request, which will involve a dialogue with the IT terminal, assigns an IP address, and checks whether the calling subscriber has IP telephone service, (Action Block 605). The NAS will act as a router for the call, and will also serve as the home agent/foreign agent, (211, FIG. 2), for the call. The NAS sends an IP telephone registration, including the NAI of the terminating customer, and the IP address assigned to that customer to the Dynamic Directory Server, (Action Block 607). The DDS stores the IP address for the NAI, and sends its identity to the ITHS, (Action Block 609). The DDS then sends the NAT of the called terminal the IP address of the DDS, the IP address which has been assigned to the terminal, and the Gateway address, saved earlier, to the ITHS, (Action Block 611). The ITHS then associates the NAI with the IP address of the DDS, (Action Block 613). The ITHS then sends a location message response back to the DDS as an acknowledgment, (Action Block 615). The ITHS sends the routing information response requested in Action Block 521 (FIG. 5) to the IT Gateway or Proxy, (Action Block 617). This response consists of the IP address of the called terminal. The DDS sends the IP telephony registration response to the network access server, (Action Block 619). The NAS then sends a registration response to the called terminal, including the IP address that has been assigned to the terminal for the call, and also including the NAI for verification, (Action Block 621). Call set-up to a registered terminal can now proceed as in the prior art under the control of the Gateway or Proxy, (Action Block 623).

The above description is of one preferred embodiment of Applicants' invention. Many other embodiments will be apparent from this description to those of ordinary skill in the art without departing from the scope of the invention. The invention is only limited by the attached claims.

What is claimed is:

1. A method of establishing a telecommunications call via the Internet to a called Internet customer whose station is not currently connected to the Internet, comprising the steps of:

registering a name of said customer station without an IP address in a customer server;

receiving said telecommunications call at a terminating customer server IP address on the Internet;

responsive to receiving said call, obtaining location information for notifying the called customer station;

responsive to receiving said location information, notifying said called customer station with a procedure that informs said called customer station that it is being called on an Internet call;

said called customer station responding to said procedure by requesting an acquisition of a terminal IP address on the Internet;

responsive to the request, assigning an IP address to the called customer station for this call;

notifying the terminating server of the assigned IP address; and responsive to informing the terminating server, establishing a connection to the called customer station at the assigned IP address;

wherein the call is established to the called customer using the assigned IP address.

2. The method of claim 1, wherein said terminating customer server is accessed via an Internet Telephony Gateway.

3. The method of claim 1, wherein said terminating customer server is an Internet Telephony Call Processing Proxy.

4. The method of claim 1, wherein the step of obtaining location information comprises the steps of:

querying an Internet Telephony Home Server; and querying a Dynamic Directory Server from said Internet Telephony Home Server.

5. The method of claim 1, wherein said called customer station is a powered-on cellular wireless customer station, and wherein said notifying step comprises the step of paging said called customer station.

6. The method of claim 5, wherein said notifying step comprises the step of paging said called customer station with a message requesting that said called customer station register on the Internet.

7. The method of claim 5, wherein the step of obtaining location information, comprises the step of querying a Home Location Register (HLR) and/or a Visitor Location Register (VLR), in accordance with prior art cellular station location methods.

8. The method of claim 7, wherein said HLR and/or VLR are queried from an Internet Telephony Home Server.

9. The method of claim 1, wherein said called customer station is a wireline station, and wherein said notifying step comprises transmitting to said called customer station a signal that it is being called on an Internet call.

10. The method of claim 9, wherein said signal is a data message.

11. The method of claim 10, wherein said data message is sent over a suppressed ringing connection.

12. The method of claim 10, wherein said data message is sent as a calling line identification message.

13. The method of claim 10, wherein said called customer is an Integrated Services Digital Network (ISDN) station, and data message is sent as an ISDN control message.

14. The method of claim 9, wherein the notifying step comprises the step of transmitting a Common Channel Signaling message, for causing said called customer to be notified, to a switch serving said called customer station.

15. Apparatus for establishing a telecommunications call via the Internet to a called customer whose station is not currently connected to the Internet, comprising:

a customer server for registering the called customer station;

a terminating customer server connected to the Internet for receiving said call;

means, responsive to receipt of said call for obtaining location information for notifying the called customer station;

means, responsive to receipt of said call and said location information, for notifying said called customer station with a procedure that informs said called customer station that it is being called on an Internet call;

said called customer station responsive to receiving the notification, for requesting an acquisition of a terminal IP address on the Internet;

means for assigning an IP address to the called customer station for this call;

means, responsive to the assignment, for notifying the terminating server of the assigned IP address; and means, responsive to notifying the terminating server for establishing a connection to the called customer station at the assigned IP address.

16. The apparatus of claim 15, wherein said terminating customer server is accessed via an Internet Telephony gateway.

17. The apparatus of claim 15, wherein said terminating customer server is an Internet Telephony Call Processing Proxy.

18. The apparatus of claim 15, wherein the means of obtaining location information comprises:

means for querying an Internet Telephony Home Server; and means for querying a Dynamic Directory Server from said Internet Telephony Home Server.

19. The apparatus of claim 15, wherein said called customer station is a powered-on cellular wireless customer station, and wherein said means for notifying comprises means for paging said called customer station.

20. The apparatus of claim 19, wherein said means for notifying comprises means for paging said called customer station with a message requesting that said called customer station register on the Internet.

21. The apparatus of claim 17, wherein the means for obtaining location information, comprises means for querying a Home Location Register (HLR) and/or a Visitor Location Register (VLR), in accordance with prior art cellular station location methods.

22. The apparatus of claim 21, wherein said means for querying HLR and/or VLR comprises an Internet Telephony Home Server.

23. The apparatus of claim 15, wherein said called customer station is a wireline station, and wherein said means for notifying comprises means for transmitting to said called customer station a signal that it is being called on an Internet call.

24. The apparatus of claim 23, wherein said signal comprises a data message.

25. The apparatus of claim 24, wherein said means for transmitting comprises means for transmitting over a suppressed ringing connection.

26. The apparatus of claim 24, wherein said means for transmitting comprises means for transmitting a calling line identification message.

27. The apparatus of claim 24, wherein said called customer station is an Integrated Services Digital Network (ISDN) station, and wherein said means for transmitting comprises means for transmitting an ISDN control message.

28. The apparatus of claim 23, wherein said means for notifying comprises means for transmitting a Common Channel Signaling message, for causing said called customer to be notified, to a switch serving said called customer station.

* * * * *